Aug. 30, 1960   P. LANCIER   2,951,131
FLOW CONTACTOR FOR PRESSURIZED ELECTRIC
CABLES, PIPELINES AND THE LIKE
Filed Aug. 15, 1958   2 Sheets-Sheet 1

Inventor:
Peter Lancier

Aug. 30, 1960          P. LANCIER          2,951,131
FLOW CONTACTOR FOR PRESSURIZED ELECTRIC
CABLES, PIPELINES AND THE LIKE
Filed Aug. 15, 1958          2 Sheets-Sheet 2
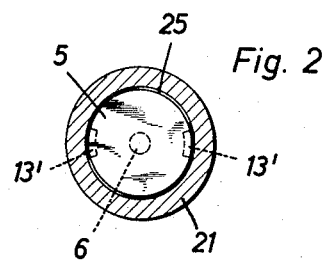
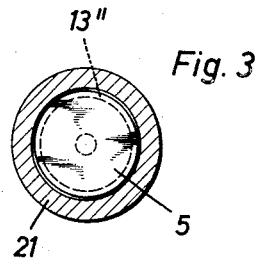
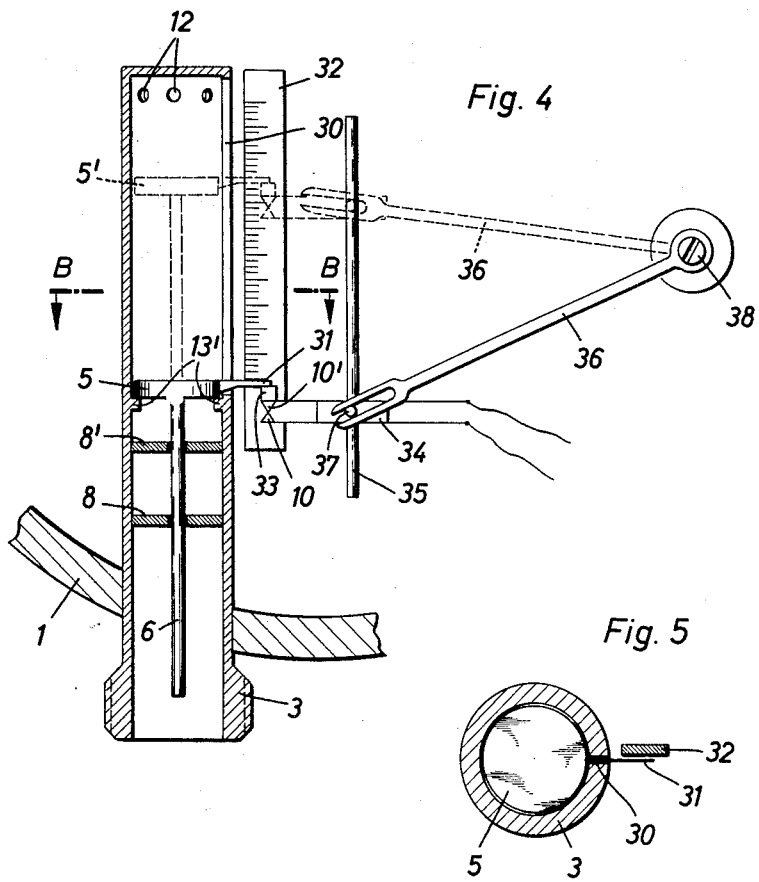
Inventor:
Peter Lancier
By    *Patent Agent*

United States Patent Office 2,951,131
Patented Aug. 30, 1960

2,951,131

FLOW CONTACTOR FOR PRESSURIZED ELECTRIC CABLES, PIPELINES AND THE LIKE

Peter Lancier, 35 Hiltruperstrasse, Wolbeck, near Munster, Westphalia, Germany

Filed Aug. 15, 1958, Ser. No. 755,284

Claims priority, application Germany Aug. 17, 1957

1 Claim. (Cl. 200—81.9)

The invention relates to a flow contactor for the supervision of electric pressure cables, pipelines and the like, particularly to a flow contactor which has a particularly high sensitivity and permits even the smallest leakages in the supervised installation to be detected.

A gas under pressure, such as nitrogen or dried air, is frequently introduced into communication cables from the ends thereof. This pressure-gas filling serves, on the one hand, to prevent the penetration of moisture into the cable in the event of minor leakages such as pores, hairline cracks and the like, while on the other hand, by measuring the pressure conditions in the cable, supervision of the cable can be effected in that an alarm can be given in the event of a pressure drop resulting from a leakage in the cable sheath.

Since the very tightly packed cable offers a very high flow resistance, it was hitherto practically impossible to supervise long lengths of cable from the termini, for example from the repeater stations. Accordingly, in the known systems for supervising cables by means of pressure gas, pressure gauges were built into the actual cable, that is to say into the cable joints between the individual lengths of cable. This is comparatively expensive, however, and in addition, the individual pressure gauges are difficult of access and maintenance, and supervision is practically impossible. Moreover, the insensitivity of the known pressure gauges does not permit any accurate location of a fault.

As a result of the invention, a flow contactor is provided which renders it possible to use even very low rates of flow for signalling. According to a further development of the invention, a flow contactor is provided which renders it possible to indicate even the smallest leakages in very long cables, by utilizing a kind of accumulator effect.

According to a further improvement, a flow contactor is provided, the sensitivity of which is adjustable and can be adapted to the flow-resistance conditions in individual cables.

Finally, a flow contactor is provided which renders it possible to measure and read off the amount of air flowing through per unit of time.

The flow contactor according to the invention consists essentially of a length of pipe inserted in the supply line from the source of pressure-gas to the cable, in which length of pipe there is mounted a displaceable piston which is provided with a piston rod and which can be moved by the flowing gas. Either a spring force or the force of gravity acting on the piston and piston rod may serve as a restoring force against the pressure of the flowing gas.

In one embodiment, which serves to measure the smallest leakages, the piston rests tightly against a corresponding seating when in the state of rest, so that no gas can flow through. If in the course of time, as a result of minor leakages, the pressure in the cable has dropped by a certain amount, the pressure of the gas dammed up in front of the piston can lift the piston for a brief period and cause the signalling of a fault.

In order to be able to adjust the sensitivity of the flow contactor, the force acting on the piston and/or the distance which the piston has to cover to make contact may be varied.

In order to be able to read off the amount of gas flowing through per unit of time, an indicator is provided on the piston which indicator can slide along a scale; since the travel of the piston is proportional to the amount of flowing gas, the amount of gas flowing through can be read off by suitable calibration of the scale. For this purpose, the pipe in which the piston slides is preferably provided with an elongated slot through which the indicator mounted on the piston projects to the outside.

The invention will now be described in more detail with reference to the drawings. These drawings merely represent examples of embodiments and should not be interpreted as limiting the scope of the invention.

Figures 2 and 3 show cross-sections on the line A—A in Figure 1, corresponding to two different embodiments of the invention;

Figure 4 shows a view of part of a further development of the flow contactor of Figure 1 in longitudinal section;

Figure 5 shows a cross-section on the line B—B in Figure 4.

Figure 1:
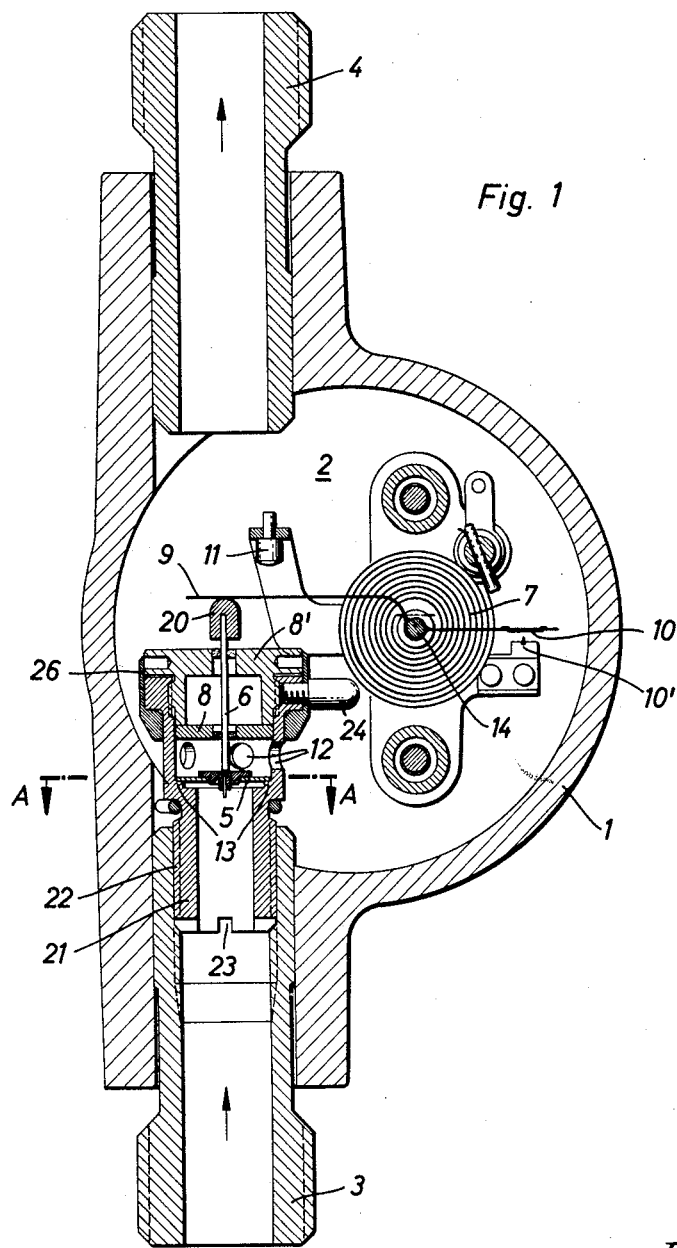
Figure 1 shows one embodiment of a flow contactor according to the invention.

The flow contactor illustrated in Figure 1 comprises a gas-tight housing 1 which may be provided with a transparent lid, not illustrated, and into the interior 2 of which lead a connecting socket 3 for connection to the source of compressed gas and a connecting socket 4 for connection to the cable. Suitable pressure reducing valves, shut-off valves and drying devices, which are not illustrated, may be arranged between the source of compressed gas and the flow contactor. The flow contactor may also be arranged either inside a cable or between cables running parallel. The flow of gas takes place in the direction indicated by arrows.

Inside the part 21 of the inlet pipe, which may be integral with the connecting socket 3, there is mounted a piston 5 which is displaceable in the axial direction of the pipe. The gap between the piston 5 and the inner wall of the pipe should be as small as possible, but the piston must be capable of being very easily displaced inside the pipe, that is to say it must not jam. In practice, this spacing is of the order of a few hundredths of a millimeter. In this embodiment, on the face remote from the inlet side of the inlet socket 3, the piston carries a piston rod 6 which is guided in bearings 8 and 8'. These bearings are preferably made of jewels. A lever 9, which is pivotally mounted at 14, presses under the action of a spring 7 against the free end of the piston rod 6 which may be provided with an insulating cap 20. The deflection of the lever 9 may be limited by a stop 11. The arm of the lever 9 remote from the piston rod 6 carries a contact plate 10, opposite which is a stationary resiliently mounted plate 10'. The supply of current to the plate 10 may be effected through the spring 7 which is constructed in the form of a spiral spring. In this case, the lever 9 is preferably mounted in jewelled bearings in the manner of the balance-wheel of a watch. Alternatively, a tension-band mounting, such as it known in measuring instruments, may be used. The spring 7 and the lever 9 may also be combined to form a leaf spring. The bearing 14 is then the point where the leaf spring is fastened and the stop 11 may serve as a stationary contact 10, in which case contact is made when the leaf spring is bent by the piston rod 6 under the influence of the gas pressure acting on the piston 5 until it touches the stop 11. Naturally, normally closed contacts may be used instead of the make contact illustrated.

Bores 12 are preferably provided in the inlet pipe 3 leading from the interior of the pipe 3 to the interior 2 of the housing 1. These bores are arranged in such a manner that the piston 5 lies between the inlet to the pipe 3 and the bores 12 when in its position of rest, whereas it comes to lie behind the apertures 12 in its other extreme position, that is to say when there is a large flow of gas and when it abuts against the bearing 8. The provision of these holes serves the purpose of ensuring that the pressure drop at the piston cannot become too great if a major leakage occurs, and instead the gas can flow comparatively unhindered out of the pipe 3 through the apertures 12 into the interior 2 of the housing 1 and from thence into the outlet 4. As a result, even in the event of major leakages sufficient gas is supplied to the cable to prevent the penetration of moisture and the device cannot be damaged by excessive gas pressure.

With this flow contactor it is possible to obtain contact action with a pressure drop of about 2 mm. water column at the piston 5. This corresponds to a rate of flow of 0.5 cm.$^3$/sec. in a model which has been constructed.

Figure 2 illustrates a section through the pipe 3 along the line A—A in Figure 1. From this figure it can be seen that the seating indicated at 13 in Figure 1 is merely in the form of two stops 13' so that between the wall of the front portion 21 of the inlet pipe 3 and the piston 5, narrow circular apertures 25 are left through which the gas can flow. In this embodiment, the piston 5 is not raised until the amount of gas flowing through per unit of time is so great that the pressure drop at the slits 25 can overcome the force of gravity and the spring force acting on the piston.

In many cases, however, it is desirable to signal leakages which are too small for the resulting flow to be able to effect a direct actuation of the piston. Such a construction is illustrated in Figure 3. The seating of the piston 5 illustrated at 13 in Figure 1 extends over the whole circumference of the piston as indicated at 13" in Figure 3. The mating surfaces of the seating 13 and of the piston 5 are ground flat or lapped so that practically no gas can flow from the inlet side of the pipe 3 into the interior 2 of the housing 1 when the piston 5 rests against the seating 13".

This arrangement works as follows: If a very slight leakage develops in the cable to be supervised, the pressure drops slowly in the cable and hence in the interior 2 of the housing 1. With small leakages, this pressure drop takes place so slowly that despite the high flow resistance of the cable no pressure drop develops which could be used to actuate a mechanical member. However, since the connection from the source of compressed gas to the cable is interrupted by the piston 5 resting tightly against the seating 13" in the flow contactor according to the invention as shown in Figure 3, the pressure in the interior of the housing 1 slowly drops, whereas in the inlet to the supply pipe 3 it retains the set value which is maintained constant by a reducing valve or the like. After the passage of a certain time, therefore, a pressure difference develops between the inlet to the pipe 3 and the interior 2 of the housing 1 which pressure difference is capable of overcoming the static friction of the piston and the forces acting on the piston. As a result, the piston 5 is lifted for a brief period in the pipe 3 and the contacts are closed. The lower limit of the sensitivity of response is practically determined only by the static friction in the various bearings, which can be kept very low as a result of the jewelled bearings, and by the forces acting on the piston. These can be reduced practically to zero if a spring force and the force of gravity are allowed to act in opposition, that is to say if the arrangement shown in Figure 1 is inverted so that the inlet pipe 3 is situated vertically above the outlet pipe 4.

In order to be able to adjust the sensitivity of the flow contactor, various means are possible. In the first place, two different sensitivities of response can be obtained with one and the same flow contactor depending on how the flow contactor is installed: if the socket connection 4 is at the top and the connection 3 at the bottom then the spring force and the force of gravity are added together, if the connection 3 is at the top and the connection 4 at the bottom, the spring force and the force of gravity are subtracted one from the other.

Furthermore, adjustment of the sensitivity is possible by varying the tension of the spring 7. This may be effected, as in the balance-wheel of a watch; if a leaf spring is used, the supporting point 14 may be pivotally constructed. Such means are known in precision engineering and may be left to those skilled in the art.

Another possibility consists in varying the distance through which the movable contact 10 has to travel in order to be able to touch the fixed contact 10'. In a further development of the invention, this is effected as a result of the fact that the front portion 21 of the inlet pipe is screwed into the socket connection 3 by means of a thread 22. The insert 21 can then be displaced axially by turning it in relation to the pipe 3 in the thread 22, by means of a spanner introduced into the connection 3 which engages in grooves 23. It is clear that as a result not only the distance between the contacts 10 and 10' but also the tension of the spring 7 is varied, and hence the sensitivity of response. In order to prevent the insert 21 from being turned too far, a projection 24 is provided which coacts with a stop, not shown. The setting of the insert and hence the adjusted sensitivity can be read off on a scale 26, provided on the periphery of the insert 21, in conjunction with a mark, not shown, through the transparent lid of the housing 1.

In the embodiment illustrated, it is sufficient to turn the insert 21 through 220° in order to vary the sensitivity of the contactor between 10 and 60 cm.$^3$/sec.

Figure 4 shows very diagrammatically a flow contactor which permits the amount of gas flowing through to be read off and the sensitivity of response to be adjusted at the same time. Only the parts which are important for the understanding are illustrated, otherwise the arrangement is constructed in the same manner as shown in Figure 1.

A displaceable piston 5 is again mounted in the inlet pipe 3; this time the piston rod 6 extends downwards in the direction of the inlet to the pipe 3. The pipe 3 is provided with a lateral narrow elongated slot 30 through which a projection or pointer 31 secured to the piston 5 extends to the outside. The width of the slot is about 20/100 mm. in practice; the thickness of the lug about 16/100 mm. Arranged along the slot 30 is a scale 32 from which the setting of the pointer 31 and hence of the piston 5 can be read off. Depending on the rate of flow of the gas, the piston rises to a greater or lesser height and a corresponding portion of the slot 30 is uncovered through which the gas can flow out of the pipe 3 into the interior 2 of the housing. The height of the piston is therefore a measure of the amount of gas flowing through per unit of time.

In this embodiment, the contacts are shown as normally closed contacts. In the normal condition, the piston 5 presses, through the lug 31, against an insulating member 33 mounted on the movable contact 10', and thus closes the contacts 10 and 10'. If the piston is raised by the flow of gas, the lug 31 releases the movable contact 10' so that the circuit is interrupted.

In order to adjust the sensitivity, that is to say the amount of gas flowing through per unit of time at which the contactor is to respond, the contact arrangement is adapted for displacement along the pipe 3. The contact arrangement, which may be secured, for example to a bracket 4 of insulating material, is displaceable along a guide 35; the displacement may be effected from the outside through a fork 36 which engages, on the one hand, on a pin 37 which is connected to the contact arrangement and can be turned, on the other hand, through a screw 38 which is mounted in an airtight manner, by means of suitable seals, not illustrated, in the transparent cover of the housing.

On rotation of the screw 38, the fork 36 swings upwards as a result of which the contact arrangement is displaced along the guide 35. As a result, the piston 5 is raised at the same time through the lug 31.

If the lever 36 is in the position shown in broken lines in Figure 4, for example, then the piston 5 is only lifted off the movable contact 33 when the amount of gas flowing through per unit of time exceeds a value which corresponds to the set position 5' of the piston.

Other possibilities are, of course, also conceivable, for the construction and arrangement of the scale and set-ring device, but this can be left to one skilled in the art. Thus the invention provides a flow contactor which responds even to the smallest leakages, which permits an adjustment of the sensitivity and hence adaptation to the various flow resistances of the cable and in addition allows the amount of gas flowing through per unit of time to be read off, as a result of which conclusions can be drawn as regards the position and magnitude of leakages.

What I claim is:

A fluid pressure-responsive combined indicating and switching device, comprising: a tubular housing having an inlet and an outlet spaced therefrom; a valve seat arranged between said inlet and outlet; a piston member slidably supported in said tubular housing for movement in the direction of the axis of said housing, said piston member having a head arranged on the downstream side of said valve seat and being adapted to lie thereagainst, said piston head being continuously urged into engagement with said valve seat so that when the pressure prevailing at said inlet is insufficient to overcome the force urging said head against said valve seat, said head will be maintained in engagement with said valve seat; a movable contact member carried by said piston head and extending out of said tubular housing through an elongated slot which permits said movable contact member to move with said piston head during movement thereof relative to said valve seat; a stationary contact member arranged exteriorly of said tubular housing and being located in the path of movement of said movable contact member so that an electric circuit may be actuated when said movable contact member is in a position corresponding to that in which said stationary contact member is set; and a scale also arranged exteriorly of said housing and extending along the path of movement of said movable contact member while the latter moves together with said head, said movable contact member thus serving as a pointer which cooperates with said scale, whereby the fluid pressure at said inlet which causes said head to be moved off said valve seat a distance dependent on the pressure, may be read on said scale and whereby an electric circuit will be actuated when the inlet pressure is equal to a predetermined pressure which corresponds to the setting of said stationary contact member.

References Cited in the file of this patent

UNITED STATES PATENTS

| | | |
|---|---|---|
| 1,411,802 | Mosher | Apr. 4, 1922 |
| 2,244,373 | Powers | June 3, 1941 |
| 2,244,402 | Powers | June 3, 1941 |
| 2,583,814 | Burklin | Jan. 29, 1952 |
| 2,735,299 | Blackburn et al. | Feb. 21, 1956 |
| 2,800,548 | Stary | July 23, 1957 |
| 2,826,754 | Carignan | Mar. 11, 1958 |
| 2,853,575 | Reynolds | Sept. 23, 1958 |